US010346718B2

(12) United States Patent
Pandey et al.

(10) Patent No.: US 10,346,718 B2
(45) Date of Patent: Jul. 9, 2019

(54) TABLET DISHWASHING DETERGENT AND METHODS FOR MAKING AND USING THE SAME

(71) Applicant: Diversey, Inc., Sturtevant, WI (US)

(72) Inventors: Prashant Kumar Pandey, Mumbai (IN); Anant Kondiram Parte, Mumbai (IN)

(73) Assignee: Diversey, Inc., Fort Mill, SC (US)

(*) Notice: Subject to any disclaimer, the term of this patent is extended or adjusted under 35 U.S.C. 154(b) by 0 days.

(21) Appl. No.: 15/889,641

(22) Filed: Feb. 6, 2018

(65) Prior Publication Data

US 2018/0165542 A1  Jun. 14, 2018

Related U.S. Application Data

(63) Continuation of application No. 14/669,604, filed on Mar. 26, 2015, now Pat. No. 9,920,288.

(60) Provisional application No. 62/023,602, filed on Jul. 11, 2014.

(51) Int. Cl.
| | | |
|---|---|---|
| *C11D 3/04* | (2006.01) | |
| *C11D 3/08* | (2006.01) | |
| *C11D 3/10* | (2006.01) | |
| *C11D 3/37* | (2006.01) | |
| *B08B 3/04* | (2006.01) | |
| *G06K 9/62* | (2006.01) | |
| *G06K 9/00* | (2006.01) | |

(52) U.S. Cl.
CPC ....... *G06K 9/6221* (2013.01); *G06K 9/00228* (2013.01); *G06K 9/00288* (2013.01); *G06K 9/00677* (2013.01)

(58) Field of Classification Search
CPC .. C11D 3/044; C11D 3/08; C11D 3/10; C11D 3/3761; C11D 17/0047; C11D 17/0073; C11D 17/0091; B08B 3/04
See application file for complete search history.

(56) References Cited

U.S. PATENT DOCUMENTS

| | | |
|---|---|---|
| 3,549,538 A | 12/1970 | Jacklin |
| 4,137,180 A | 1/1979 | Naik et al. |
| 4,725,377 A | 2/1988 | Choi |
| 4,767,547 A | 8/1988 | Straathof et al. |
| 4,789,491 A | 12/1988 | Chang et al. |
| 4,806,255 A | 2/1989 | König et al. |
| 5,053,161 A | 10/1991 | Sprague |
| 5,133,892 A | 7/1992 | Chun et al. |
| 5,288,410 A | 2/1994 | Cuisia |
| 5,352,365 A | 10/1994 | Fuller |
| 5,358,655 A | 10/1994 | Kruse et al. |

(Continued)

FOREIGN PATENT DOCUMENTS

| | | |
|---|---|---|
| CA | 2822897 | 7/2012 |
| WO | WO 2000/002982 | 1/2000 |

(Continued)

OTHER PUBLICATIONS

Examination Report for Australian Patent Application No. 2015288195 dated Jun. 1, 2018 (3 pages).

(Continued)

*Primary Examiner* — Brian P Mruk
(74) *Attorney, Agent, or Firm* — Michael Best & Friedrich LLP

(57) ABSTRACT

A tablet including a dishwashing detergent composition and a crosslinked acrylic acid polymer having a weight average molecular weight (Mw) of at least 500,000.

21 Claims, 4 Drawing Sheets

(56) References Cited

U.S. PATENT DOCUMENTS

| | | | |
|---|---|---|---|
| 5,801,137 A | 9/1998 | Addison et al. | |
| 5,846,339 A | 12/1998 | Masshoff et al. | |
| 6,083,895 A | 7/2000 | Warwick | |
| 6,162,777 A * | 12/2000 | Gorlin | C11D 1/83 510/224 |
| 6,165,970 A | 12/2000 | Williams et al. | |
| 6,172,036 B1 | 1/2001 | Cruickshank et al. | |
| 6,194,368 B1 | 2/2001 | Waschenbach et al. | |
| 6,221,832 B1 * | 4/2001 | Casteel | C11D 17/06 510/446 |
| 6,242,406 B1 | 6/2001 | Katsuda et al. | |
| 6,484,735 B1 | 11/2002 | Gordon et al. | |
| 7,557,074 B2 | 7/2009 | Becker et al. | |
| 8,101,027 B2 | 1/2012 | Vandermeulen et al. | |
| 8,283,301 B2 | 10/2012 | Manna et al. | |
| 8,303,721 B2 | 11/2012 | Warkotsch et al. | |
| 8,389,458 B2 | 3/2013 | Tsumori et al. | |
| 8,440,601 B2 | 5/2013 | Seebeck et al. | |
| 2002/0032142 A1 | 3/2002 | Smets et al. | |
| 2002/0187911 A1 | 12/2002 | Liew | |
| 2003/0027737 A1 | 2/2003 | Evers | |
| 2004/0077516 A1 | 4/2004 | Man et al. | |
| 2005/0187129 A1 | 8/2005 | Chakrabarty et al. | |
| 2006/0079438 A1 | 4/2006 | Brush et al. | |
| 2006/0094639 A1 | 5/2006 | Martin et al. | |
| 2008/0274930 A1 | 11/2008 | Smith et al. | |
| 2009/0036345 A1 | 2/2009 | Kulbick et al. | |
| 2009/0130934 A1 * | 5/2009 | Schmidt | C11D 1/62 442/96 |
| 2009/0209447 A1 | 8/2009 | Meek et al. | |
| 2010/0000579 A1 | 1/2010 | Reinbold et al. | |
| 2010/0081606 A1 | 4/2010 | Barger et al. | |
| 2010/0154831 A1 | 6/2010 | Neplenbroek et al. | |
| 2011/0065624 A1 | 3/2011 | Boutique et al. | |
| 2011/0171155 A1 | 7/2011 | Federle et al. | |
| 2011/0232691 A1 | 9/2011 | Neplenbroek et al. | |
| 2011/0251115 A1 | 10/2011 | Dupont et al. | |
| 2011/0287997 A1 | 11/2011 | Busch et al. | |
| 2012/0065119 A1 | 3/2012 | Morschhaeuser et al. | |
| 2012/0118321 A1 | 5/2012 | Neplenbroek et al. | |
| 2012/0128608 A1 | 5/2012 | Rodrigues et al. | |
| 2012/0196784 A1 | 8/2012 | Seebeck et al. | |
| 2012/0213759 A1 | 8/2012 | Karsten et al. | |
| 2012/0304402 A1 | 12/2012 | Miracle et al. | |
| 2013/0071913 A1 | 3/2013 | Andersen et al. | |
| 2013/0123161 A1 | 5/2013 | Randall et al. | |
| 2013/0206181 A1 | 8/2013 | Giles et al. | |
| 2014/0053877 A1 | 2/2014 | Letzelter et al. | |
| 2014/0053878 A1 | 2/2014 | Letzelter et al. | |
| 2014/0065288 A1 | 3/2014 | Brown et al. | |
| 2016/0010034 A1 | 1/2016 | Pandey et al. | |
| 2016/0068620 A1 * | 3/2016 | Tamareselvy | C08F 222/02 526/318.2 |

FOREIGN PATENT DOCUMENTS

| | | |
|---|---|---|
| WO | WO 2001/002528 | 1/2001 |
| WO | WO 2006/119162 | 11/2006 |
| WO | WO 2008/137769 | 11/2008 |
| WO | WO 2008/147940 | 12/2008 |
| WO | WO 2009/006603 | 1/2009 |
| WO | WO 2010/065483 | 6/2010 |
| WO | WO 2012/025740 | 3/2012 |
| WO | WO 2012/028203 | 3/2012 |
| WO | 2014143773 A1 | 9/2014 |

OTHER PUBLICATIONS

Bhagwati Chemicals, "CODEX DS" <http://www.bhagwatichemicals.com/codex-ds-1806960.html> website publicly available at least as early as May 6, 2014.
AkzoNobel, "Dissolvine® GL Technical brochure," 2010 (16 pages).
Rohm and Haas, Acusol™ 445/445N/445ND, 2006 (5 pages).
BASF Corporation, "Sokalan® PA 25 CL PN Polyacrylic Acid Dispersant," 2007 (1 page).
BASF Corporation, "Sokalan® PA 30 CL PN Polyacrylic Acid Dispersant," 2004 (1 page).
Kolodynska, D., "Chelating Agents of a New Generation as an Alternative to Conventional Chelators for Heavy Metal Ions Removal from Different Waste Waters," Expanding Issues in Desalination, 2011, 17:339-370.
BASF The Chemical Company, "Safety Data Sheet Sokalan CP 12 S," 2010 (6 pages).
BASF The Chemical Company, "Safety Data Sheet Sokalan CP 5 Granules," 2008 (6 pages).
BASF The Chemical Company, "Safety Data Sheet Sokalan® PA 25 CL PN," 2012 (6 pages).
BASF The Chemical Company, "Safety Data Sheet Sokalan® PA 30 CL," 2006 (6 pages).
Lubrizol, "Carbopol® Ultrez 20 Polymer," Quick Start guide, CP-34, 2006 (2 pages).
Lubrizol, "Carbopol® Ultrez 20 Polymer," Product Specifications, 2006 (2 pages).
Lubrizol, "Carbopol® Ultrez 20 Polymer," Technical Data Sheet, TDS-332, 2006 (2 pages).
Lubrizol, "Carbopol® Polymers for Controlled Release Matrix Tablets," Frequently Asked Questions, 2008 (8 pages).
Lubrizol, "Carbopol® 674 Polymer," Product Specifications, 2010 (1 pages).
Lubrizol, "Carbopol® 674 Polymer," Technical Data Sheet, TDS-736, 2010 (2 pages).
Lubrizol, "Guidance Document for Processing Carbopol® Polymers in Oral Solid Dosage Forms," Lubrizol LifeScience Polymers Link Science to Life™, 2013 (8 pages).
Lubrizol, "Carbopol® Polymers Overview," 2008 (41 pages).
Lubrizol, "Carbopol® 674 Polymer," Material Safety Data Sheet, 2013 (5 pages).
Lubrizol, "Molecular Weight of Cathopol® and Pemulen™ Polymers," Technical Data Sheet, TDS-222, 2008 (3 pages).
EVONIK Industries, "Varisoft 222 LM 90%," Material Safety Data Sheet, 2013 (11 pages).
Stepan, "Stepantex® VK 90," Product Bulletin, 2011 (2 pages).
Sigma Aldrich, Arquad® 2HT-75 <http://www.sigmaaldrich.com/catalog/product/aldrich/64402?lang=en&region=US> (website publicly available at least as early as May 22, 2014).
Stepan, "Accosoft® 501," Product Bulletin, 2010 (2 pages).
Stepan, "Accosoft® 808," Product Bulletin, 2010 (2 pages).
Rhondia, "Mirapol Surf-S" publicly available at least as early as May 22, 2014 (36 pages).
Stepan, "Accosoft® 550-90 HF," Product Bulletin, 2010 (2 pages).
United States Patent Office Action for U.S. Appl. No. 14/669,604 dated Apr. 11, 2016 (10 pages).
Final Office Action from the United States Patent and Trademark Office for U.S. Appl. No. 14/669,604 dated Oct. 17, 2016 (6 pages).
PCT/US2015/037431 International Preliminary Report on Patentability and Written Opinion dated Jan. 17, 2017 (7pages).
PCT/US2015/037422 International Preliminary Report on Patentability and Written Opinion dated Jan. 17, 2017 (6 pages).
PCT/US2015/037425 International Preliminary Report on Patentability and Written Opinion dated Jan. 17, 2017 (6 pages).
Office Action from the United States Patent and Trademark Office for U.S. Appl. No. 14/673,042 dated Apr. 4, 2017 (11 pages).
Office Action from the United States Patent and Trademark Office for U.S. Appl. No. 14/669,604 dated Mar. 3, 2017 (8 pages).
Office Action from the United States Patent and Trademark Office for U.S. Appl. No. 14/673,042 dated Dec. 15, 2017 (11 pages).
EP15818602.3 Extended European Search Report dated Feb. 13, 2018 (8 pages).
Evonik Industries AG, "Varisoft 222 LM 90%—Techincal information", (2010) pp. 1-4.
Evonik Industries AG, "Varisoft 222 LM 90%—Safety Data Sheet (SDS-US" (Mar. 23, 2015) pp. 1-11.
International Search Report and Written Opinion for Application No. PCT/US2015/37422 dated Sep. 16, 2015 (15 pages).
International Search Report and Written Opinion for Application No. PCT/US2015/37425 dated Sep. 30, 2015 (13 pages).

(56) References Cited

OTHER PUBLICATIONS

Lubrizol, "Viscosity of Carbopol® Polymers in Aqueous Systems," Technical Data Sheet, TDS-730 (2010) 10 pages).
International Search Report and Written Opinion for Application No. PCT/US2015/37431 dated Sep. 15, 2015 (10 pages).
United States Patent and Trademark Office Notice of Allowance for U.S. Appl. No. 14/329,642 dated May 20, 2015 (18 pages).
United States Patent and Trademark Office Notice of Allowance for U.S. Appl. No. 14/816,889 dated Sep. 21, 2015 (8 pages).
United States Patent Office Action for U.S. Appl. No. 14/637,042 dated Mar. 14, 2016 (9 pages).

\* cited by examiner

TABLET DISHWASHING DETERGENT AND METHODS FOR MAKING AND USING THE SAME

CROSS-REFERENCE TO RELATED APPLICATION

This application is a continuation of U.S. patent application Ser. No. 14/669,604 filed Mar. 26, 2015, now U.S. Pat. No. 9,920,288, which application claims the benefit of and priority to U.S. Provisional Patent Application No. 62/023,602, filed Jul. 11, 2014, the entire content of which is hereby incorporated by reference.

FIELD

Provided are tablet forms of dishwashing detergent which include a crosslinked acrylic acid polymer as a binder.

INTRODUCTION

There has recently been a renewed focus on developing new Auto-Dishwashing Detergent (ADD) formulations with increased product performance. Today there is an array of automatic dishwashing detergents in various forms. These forms can be classified into four classes—powders, tablets, liquids, and gels.

The powders were the first form to be developed and are generally free flowing granules. They are very stable due to the nature of the materials, but have a tendency to clump when placed in high-humidity areas. Tablets are formulated for effective cleaning and convenience and eliminate measuring, waste, and mess. Unlike powders, tablets are typically pre-wrapped, and this avoids issues with moisturization. However, depending on the conditions, tablets sometimes do not completely dissolve. Liquid automatic dishwashing detergents have gained more popularity over powder forms due to their convenience and performance benefits. Nonetheless, liquid formulations have been shown to demonstrate physical instability and residues from the liquids may accumulate on the outside of the bottle. Gels, on the other hand, are formulated for controlled dispensing. Gels dissolve easily and are less likely than powders to be spilled.

Nowadays, there is an increased consumer demand for detergent products that emphasize convenience and ease of use, as exemplified by detergent tablets. Consumer-relevant characteristics of tablets include ease of dispensing and convenience in handling, i.e., no dosing and dispensing aids are needed. Other advantages include precise dosing, smaller packages as compared with powder products due to the highly concentrated form, extra portability, and a more accurate sense of how many washes remain in the detergent box. Tablets are the most compact delivery form of nonliquid detergents. These characteristics result in benefits of tablets in terms of lower packaging volume, ease of transportation and storage, and reduced shelf space. Detergent tablets therefore belong to the super-compact detergent category.

The requirements of ADD tablets include sustained disintegration with controlled dissolution and the ability to last for numerous washes, irrespective of operational conditions. Upon first contact with water, be it in the hood type dishwashing machines or under-counter glass washers, tablets advantageously should deliver a constant number of washes with controlled dissolution in every wash. In addition, intermediate disintegration of tablets or tablet shape deformation should be minimized or avoided.

Another desirable property of heavy-duty detergent tablets is sufficient hardness to facilitate handling during packaging, transportation, and use. The conflicting desired properties of sufficient hardness and controlled disintegration have to be well balanced. Thus, there is a need for detergent tablets that dissolve in a controlled manner during wash cycles and that retain sufficient hardness for manufacture and handling.

SUMMARY

In one aspect, a tablet is provided. The tablet includes a dishwashing detergent composition and a crosslinked acrylic acid polymer having a weight average molecular weight (Mw) of at least 500,000.

In another aspect, a method of preparing a dishwashing detergent tablet is provided. The method includes the steps of providing a dishwashing detergent composition; mixing the detergent composition with a crosslinked acrylic acid polymer having a weight average molecular weight (Mw) of at least 500,000; and compressing the mixture into a tablet.

In yet another aspect, a method of washing wares is provided. The method includes the steps of contacting a wash liquid with a detergent tablet in an automatic dishwashing machine, wherein the detergent tablet comprises a dishwashing detergent composition and a crosslinked acrylic acid polymer having a weight average molecular weight (Mw) of at least 500,000.

Other aspects of the invention will become apparent by consideration of the detailed description and accompanying drawings.

Figure 1:
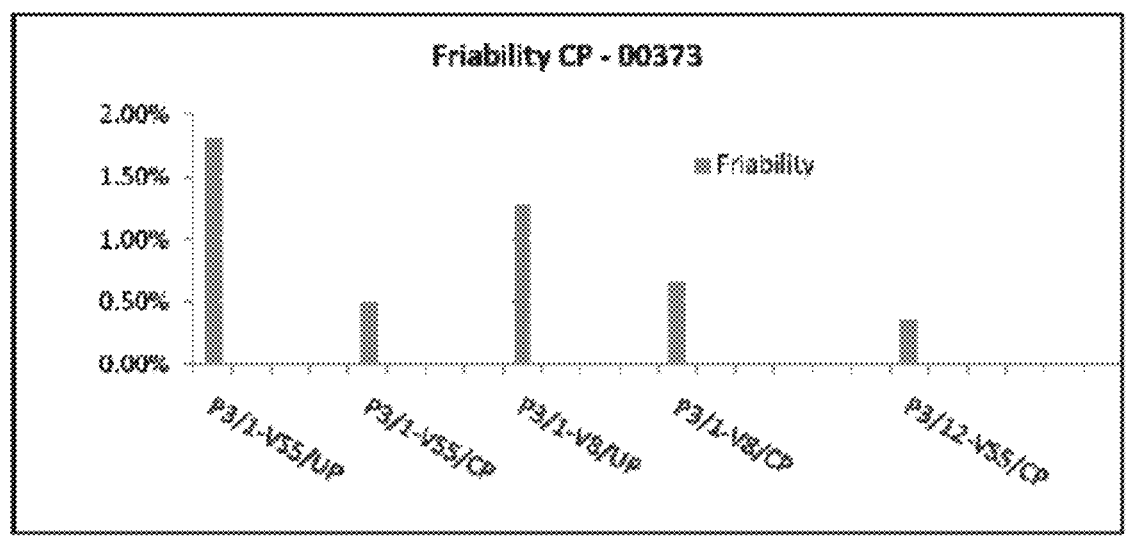
FIG. 1 shows results of friability test on tablets disclosed in Example 2 containing 2% of Ultrez 20 (UP) or Carbopol 674 (CP).

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

DETAILED DESCRIPTION

The use of "including," "comprising," or "having" and variations thereof herein is meant to encompass the items listed thereafter and equivalents thereof as well as additional items. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

The modifier "about" used herein in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito, 1999; Smith and March March's Advanced Organic Chemistry, 5th Edition, John Wiley & Sons, Inc., New York, 2001; Larock, Comprehensive Organic Transformations, VCH Publishers, Inc., New York, 1989; Carruthers, Some Modern Methods of Organic Synthesis, 3rd Edition, Cambridge University Press, Cambridge, 1987; the entire contents of each of which are incorporated herein by reference.

The present disclosure relates to a tablet form of dishwashing detergent. The tablet includes a dishwashing detergent composition and a crosslinked acrylic acid polymer having a weight average molecular weight (Mw) of at least 500,000. The crosslinked acrylic acid polymer provides the tablet with both sufficient hardness and controlled dissolution.

The term "acrylic acid polymer" as used herein means a polymer of substituted or unsubstituted acrylic acid. The crosslinked acrylic acid polymers include both homopolymers and copolymers. The polymers may comprise a series of monomer units that may be substituted, unsubstituted or both. Examples of suitable substituted acrylate monomers include, but are not limited to, alkyl substituted acrylates. The term "alkyl" as used herein, means a straight or branched, saturated hydrocarbon chain. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and C10-C30 alkyl. Examples of suitable alkyl substituted acrylates include, but are not limited to methacrylate, ethyl acrylate, butyl acrylate, and C10-C30 alkyl acrylates. Copolymers include the copolymers of acrylate and alkyl acrylate, such as the copolymer of acrylate and C10-30 alkyl copolymers. Suitably, the polymer is crosslinked with a crosslinker, such as polyalkenyl ethers, divinyl glycol, and combinations thereof. Polymers suitable for the present disclosure include carbomer copolymers, which are high molecular weight copolymers of acrylic acid and a long chain alkyl methacrylate crosslinked with allyl ethers of polyalcohol. Commercial carbomer products useful for the present disclosure include, for example, Carbopol® Ultrez 20 and Carbopol® 674 by Lubrizol Corporation.

In general, the crosslinked acrylic acid polymer of the present disclosure has a weight average molecular weight (Mw) of at least about 500,000. For example, when a non-crosslinked polymer is formed by polymerization under the same conditions as those used to form crosslinked polymer but without the crosslinker, the weight average molecular weights of the resulting polymers are in the order of about 500,000 as measured by gel permeation chromatography using linear polyacrylic acid as reference. In various embodiments, the weight average molecular weight is at least about $1 \times 10^6$, at least about $1 \times 10^7$, at least about $1 \times 10^8$, or at least about $1 \times 10^9$.

The crosslinked acrylic acid polymer typically is in powder form and in various embodiments has a glass transition temperature of from about 50° C. to about 150° C. In other embodiments, the glass transition temperature may be from about 70° C. to about 130° C., from about 80° C. to about 120° C., or from about 90° C. to about 110° C. In various embodiments, the glass transition temperature is at least about 50° C., at least about 60° C., at least about 70° C., at least about 80° C., at least about 90° C., at least about 100° C., at least about 110° C., at least about 120° C., at least about 130° C., or at least about 140° C. In other embodiments, the glass transition temperature is less than about 150° C., less than about 140° C., less than about 130° C., less than about 120° C., less than about 110° C., less than about 100° C., less than about 90° C., less than about 80° C., less than about 70° C., or less than about 60° C. In one particular embodiment, the crosslinked acrylic acid polymer has a glass transition temperature of about 105° C.

In one embodiment, when dispersed in water at a concentration of 1%, at a pH of about 7.5, and at a temperature of 25° C., the crosslinked polymer of the present disclosure typically has a viscosity of at least 3000 mPa·S. In other embodiments, the viscosity under such condition can be at least 5000 mPa·S, at least 10000 mPa·S, at least 15000 mPa·S, or at least 20000 mPa·S.

In some embodiments, the crosslinked acrylic acid polymer is present at an amount of from about 0.1% to about 10% by weight of the tablet. In other embodiments, the content of the crosslinked polymer can be from about 0.2% to about 8%, from about 0.5% to about 7%, or from about 1% to about 5% by weight of the tablet. In various embodiments, the crosslinked acrylic acid polymer is present at an amount by weight of the tablet of at least about 0.1%, at least about 0.2%, at least about 0.5%, at least about 1%, at least about 2%, at least about 3%, at least about 4%, at least about 5%, at least about 6%, at least about 7%, at least about 8%, or at least about 9%. In other embodiments, the crosslinked acrylic acid polymer is present at an amount by weight of the tablet of less than about 10%, less than about 9%, less than about 8%, less than about 7%, less than about 6%, less than about 5%, less than about 4%, less than about 3%, less than about 2%, less than about 1%, less than about 0.5%, or less than about 0.2%. In one particular embodiment, the crosslinked polymer is present at an amount of from about 1% to about 5% by weight of the tablet. Advantageously, the detergent tablets of the subject technology can be made without conventional binders, such as those based on clay, PEG, stearate, etc.

In various embodiments, the presently-disclosed tablet includes a detergent composition suitable for use in an automatic dishwashing machine. The detergent compositions can include ingredients selected from alkalinity sources, surfactants, sequestrating agent, and defoamer, rinse aid, and combinations thereof.

Suitable alkalinity sources include, but are not limited to, sodium carbonate (soda ash), caustic agents (such as sodium or potassium hydroxides), and alkali metal silicates (such as sodium metasilicate). Especially effective is sodium silicate having a mole ratio of $SiO_2:Na_2O$ of from about 1.0 to about 3.3. In various embodiments, the mole ratio is at least about 1.0, at least about 1.5, at least about 2.0, at least about 2.5, or at least about 3.0. In other embodiments, the mole ratio is less than about 3.3, less than about 3.0, less than about 2.5, less than about 2.0, less than about 1.5, or less than about 1.0. The pH of the detergent composition typically is in the alkaline region, preferably having a pH of ≥9, and more preferably ≥10.

Surfactants and especially non-ionics may be present to enhance cleaning and/or to act as defoamer. Suitable surfactants include cationic, anionic, zwitterionic, and nonionic surfactants as known in the art. In various embodiments, the surfactant may be present in a concentration of about 0% to about 10% by weight, preferably from about 0.5% to about 5% by weight, most preferably from about 0.2% to about 2% by weight. In various embodiments, the surfactant is present at a concentration of at least about 0% by weight, at least about 0.1% by weight, at least about 0.2% by weight, at least about 0.3% by weight, at least about 0.4% by weight, at least about 0.5% by weight, at least about 1% by weight, at least about 2% by weight, at least about 3% by weight, at least about 4% by weight, at least about 5% by weight, at least about 6% by weight, at least about 7% by weight, at least about 8% by weight, or at least about 9% by weight. In other embodiments, the surfactant is present at a concentration of less than about 10% by weight, less than about 9% by weight, less than about 8% by weight, less than about 7% by weight, less than about 6% by weight, less than about 5% by weight, less than about 4% by weight, less than about 3% by weight, less than about 2% by weight, less than about 1% by weight, less than about 0.5% by weight, less than about 0.4% by weight, less than about 0.3% by weight, less than about 0.2% by weight, or less than about 0.1% by weight.

The sequestrating agent inhibits scale formation resulting from the crystallization of calcium and magnesium salts (such as carbonate) from liquid within the dishwasher and the precipitation of the solid crystals on the surfaces of the washed items and the washing machine. The sequestrating agent can include a phosphate-based or non-phosphate formulation. Phosphate-based sequestrating agent typically includes alkali metal salts of polyphosphates (such as sodium tripolyphosphate) and phosphonic acid. Non-phosphate sequestrating agents include low molecular weight acrylic acid (e.g. average molecular weight <20,000); aminocarboxylic acids, such as nitrilotriacetic acid (NTA), methylglycine diacetic acid (MGDA), glutamic acid diacetic acid (GLDA), diethylene triamine pentaacetic acid (DTPA), hydroxyethyl ethylene diamine triacetic acid (HEDTA), ethylenediaminetetraacetic acid (EDTA) and combinations thereof; and phosphonic acid, such as 1-hydroxyethane 1,1-diphosphonic acid (HEDP), amino tris(methylenephosphonic acid) (ATMP), ethylenediamine tetra(methylene phosphonic acid) (EDTMP), tetramethylenediamine tetra (methylene phosphonic acid) (TDTMP), hexamethylenediamine tetra(methylene phosphonic acid) (HDTMP), diethylenetriamine penta(methylene phosphonic acid) (DTPMP), and combinations thereof.

Suitably, the detergent composition contains a non-phosphate formulation, and the total phosphorus content in the composition is controlled at a low level. For example, the element phosphorus content can be in the detergent composition can be no more than 4%, no more than 3%, no more than 2%, no more than 1%, or even no more than 0.5% by weight of the composition. Preferably, the element phosphorus content is no more than 1% by weight of the scale inhibition composition. Suitably, the sequestrating agent contains low level of NTA, or is free of NTA. Preferably, the detergent composition includes a sequestrating blend which includes low molecular weight acrylic acid polymer, an aminocarboxylic acid other than NTA, and a phosphonic acid. In one embodiment, the sequestrating agent contains low molecular weight acrylic acid polymer (average molecular weight <12,000), MGDA, and HEDP, as described in U.S. Ser. No. 14/329,642 to Parte et al. ("SCALE-INHIBITION COMPOSITIONS AND METHODS OF MAKING AND USING THE SAME," filed Jul. 11, 2014), which is incorporated by reference herein in its entirety.

Various defoamers can be used in the detergent composition as known to those skilled in the art. In some embodiments, a solid defoaming agent may be preferred. Examples of suitable solid defoamers are: SILFOAM® SP 150 (Wacker Chemie AG; Silicone Antifoam Powder) or DC 2-4248S (Dow Corning; powdered antifoam).

Suitable rinse aids include, for example, polysaccharide (such as those disclosed in WO 2008/147940), cationic starch (such as those disclosed in WO 2009/006603 and WO 2010/065483), polymeric surfactants (such as those disclosed in WO 2006/119162), and the cationic esterquat (i.e. quaternary ammonium salts with fatty alkyl chains) disclosed in U.S. Ser. No. 62/023,603 to Parte et al. ("DISHWASHING DETERGENT AND METHODS OF MAKING AND USING THE SAME," filed Jul. 11, 2014). U.S. Ser. No. 62/023,603, WO 2006/119162, WO 2008/147940, WO 2009/006603, and WO 2010/065483 are each incorporated by reference herein in their entireties. Suitable commercial rinse aids include cationic starches such as CATO 308 (cationic tapioca starch from National Starch & Chemical Limited), Vector IC 27216 (Roquette), and Solbond NE 60 (Solam GmbH), and cationic esterquat such as Varisoft 222LM (Evonik). Preferably, the rinse aid includes cationic starch products, such as Solbond NE 60 (CAS No. 56780-58-6, (3-chloro-2-hydroxypropyl)trimethylammonium chloride modified starch), which is a cationic high viscous starch in powder form (approximately 87%).

Advantageously, the tablet dishwashing detergent described herein provides satisfactory drying performance for a variety of substrates (such as glass, plastic, and stainless steel). In some embodiments, the surface of the ware after washing dries in less than 10 minutes, less than about 9 minutes, less than about 8 minutes, less than about 7 minutes, less than about 5 minutes, less than about 4 minutes, less than about 3 minutes, less than about 2 minutes, or even less than about 1 minute. Preferably, the surface of the ware dries in less than about 3 minutes. More preferably, the surface of the ware dries in less than about 1 minute.

The dishwashing detergent tablet of the present disclosure can be prepared by providing the detergent composition, mixing the detergent composition with a crosslinked acrylic acid polymer having a weight average molecular weight (Mw) of at least 500,000 as disclosed herein, and compressing the mixture into a tablet. In one embodiment, the tablets are made without including other conventional binders, such as those based on clay, PEG, stearate, etc. Typically, the preparation method includes dry mixing the powders of various detergent ingredients such as alkalinity source, sequestrating agent, defoamers, surfactants, and rinse aid. The crosslinked acrylic acid polymer (such as Carbopol or other carbomer polymers) is added and mixed together with the detergent ingredients in a suitable blender (such as an octagonal blender) for a suitable period of time (e.g. 5-15 minutes) to obtain a homogeneous dry mixture. The mixture can then be transferred to a rapid mixer granulator and granulated using a chopper. In some embodiments, water can be added during the granulation process to an amount of no more than 5% by weight of the mixture. In other embodiments, water is added during the granulation process to an amount of less than about 10% by weight of the mixture, less than about 9% by weight of the mixture, less than about 8% by weight of the mixture, less than about 7% by weight of the mixture, less than about 6% by weight of the mixture, less than about 5% by weight of the mixture, less than about 4% by weight of the mixture, less than about 3% by weight of the mixture, less than about 2% by weight of the mixture, or less than about 1% by weight of the mixture. The use of a chopper prevents lump formation due to moisture for effective granulation. The RMG speed and granulation time typically are controlled such that the temperature of the mixture in various embodiments does not exceed 55° C. In other embodiments, the temperature of the mixture during the granulation is controlled so as not to exceed 50° C. or not to exceed 45° C. The granule size typically can pass through a 10 mesh sieve. Preferably, the granule size can pass through a 30 mesh sieve. Bigger granules are passed through a multi mill using a 2 mm sieve. The prepared granules typically have a moisture content of from about 1% to about 5%, preferably from about 2% to about 4%. In various embodiments, the moisture content is at least about 1%, at least about 2%, at least about 3%, or at least about 4%. In other embodiments, the moisture content is less than about 5%, less than about 4%, less than about 3%, or less than about 2%.

Typically, tablets can be made by compressing the granules using a single-stroke punching machine with a pressure of about 20 metric tons. For example, a single-stroke multipunch tableting machine can be used, which has an output of 3300-65000 tablets per hour, a 68 mm tablet diameter (max.), a 30 mm filing depth, and a 12-20 metric ton operating pressure. The machine is fitted on a rigid stand, with a 3HP, 3-phase, 1440 RPM electric motor. In various embodiments, the tablets have a diameter of at least about 20 mm, such as at least about 25 mm, at least about 30 mm, at least about 35 mm, at least about 40 mm, at least about 45 mm, at least about 50 mm, at least about 55 mm, at least about 60 mm, at least about 65 mm, at least about 70 mm, at least about 75 mm, at least about 80 mm, at least about 85 mm, at least about 90 mm, or at least about 95 mm. In various embodiments, the tablets have a diameter of at most about 100 mm, such as at most about 95 mm, at most about 90 mm, at most about 85 mm, at most about 80 mm, at most about 75 mm, at most about 70 mm, at most about 65 mm, at most about 60 mm, at most about 55 mm, at most about 50 mm, at most about 45 mm, at most about 40 mm, at most about 35 mm, at most about 30 mm, or at most about 25 mm. This includes embodiments where the diameter of tablets is from about 20 mm to about 100 mm, from about 30 mm to about 90 mm, from about 40 mm to about 80 mm, and from about 50 mm to about 70 mm. Preferably, the tablets have a diameter of from about 50 mm to about 70 mm, more preferably from about 55 to about 65 mm.

In various embodiments, the tablets have a thickness of at least about 5 mm, such as at least about 10 mm, at least about 15 mm, at least about 20 mm, at least about 25 mm, at least about 30 mm, or at least about 35 mm. In various embodiments, the tablets have a thickness of at most about 40 mm, such as at most about 35 mm, at most about 30 mm, at most about 25 mm, at most about 20 mm, or at most about 15 mm. This includes embodiments where the thickness of tablets is from about 5 mm to about 40 mm, from about 10 mm to about 35 mm, or from about 15 mm to about 30 mm. Suitably, the tablets have a thickness of from about 10 mm to about 40 mm, or from about 10 mm to about 30 mm, or from about 10 mm to about 25 mm, or from about 10 mm to about 20 mm. Preferably, the tablet has a thickness of from about 10 mm to about 20 mm.

In various embodiments, the tablets have a weight of at least about 10 grams, such as at least about 15 grams, at least about 20 grams, at least about 25 grams, at least about 30 grams, at least about 35 grams, at least about 40 grams, at least about 45 grams, at least about 50 grams, at least about 55 grams, at least about 60 grams, at least about 65 grams, at least about 70 grams, at least about 75 grams at least about 80 grams, at least about 85 grams, at least about 90 grams, at least about 95 grams, at least about 100 grams, at least about 105 grams, at least about 110 grams, or at least about 115 grams. In various embodiments, the tablets have a weight of at most about 120 grams, such as at most about 115 grams, at most about 110 grams, at most about 105 grams, at most about 100 grams, at most about 95 grams, at most about 90 grams, at most about 85 grams, at most about 80 grams, at most about 75 grams, at most about 70 grams, at most about 65 grams, at most about 60 grams, at most about 55 grams, at most about 50 grams, at most about 45 grams, at most about 40 grams, at most about 35 grams, at most about 30 grams, at most about 25 grams, or at most about 20 grams. This includes embodiments where the weight of the tablet is from about 15 grams to about 120 grams, from about 20 grams to about 115 grams, from about 25 grams to about 110 grams, from about 30 grams to about 105 grams, from about 35 grams to about 100 grams, from about 40 grams to about 95 grams, from about 45 grams to about 90 grams, from about 50 grams to about 85 grams, from about 55 grams to about 80 grams, or from about 60 grams to about 75 grams. Suitably, the tablets have a weight of about 15 grams to about 40 grams, such as from about 20 grams to about 35 grams; or from about 40 grams to about 80 grams, such as from 50 grams to about 70 grams. Preferably, the tablets have a weight of from about 50 grams to about 70 grams, more preferably from about 55 grams to about 65 grams.

In certain embodiments, the tablets have a diameter of from about 50 mm to about 70 mm, such as from about 55 mm to about 65 mm; a thickness of from about 10 mm to about 20 mm, such as from about 10 mm to about 15 mm; and a weight from about 40 grams to about 80 grams, such as from about 50 to about 70 grams, or from about 55 grams to about 65 grams. Other tableting parameters and techniques as known in the art can also be included in the present methods.

The hardness of the tablets of the present disclosure can be assessed by a friability test. Friability is a measure of the tablet's ability to withstand both shock and abrasion without crumbling during the handling of manufacturing, packaging, shipping, and consumer use. Friability can be determined by measuring the weight loss of the tablet after repeated dropping from a certain height using a laboratory device. A lower weight loss indicates a higher ability to withstand shock and abrasion. In some embodiments, the tablets of the present disclosure lose less than about 5% of weight in the friability test. In other embodiments, such weight loss can be less than about 4%, less than about 3%, less than about 2%, or even less than about 1% of the tablet weight. In one particular embodiment, the tablets of the present disclosure lose less than about 2% of weight in the friability test. In one embodiment, preparation of the tablets does not require additional process control devices or pressure, other than what is described above, to achieve such levels of hardness.

The dissolution rates of the tablets of the present disclosure can be tested in an automatic dishwashing machine. Typically, samples of tablets from each set of hardness and weight levels are subjected to dissolution tests in a dishwashing machine to determine the number of wash cycles the tablets can survive before complete dissolution. As an additional parameter, tablets may be placed in different locations of a hood-type, single-tank dishwashing machine before being tested for a number of wash cycles.

Results from the present technology indicate that use of the crosslinked acrylic acid polymer (e.g. carbomer) as a binder provides controlled dissolution to the present detergent tablets. In one embodiment, the tablets of the subject technology do not need a holder to control dissolution, which is a typical method for tablet control in industrial wash processes. In another embodiment, the tablets of the present disclosure can undergo multiple wash cycles, providing a controlled dissolution rate. For example, tablets weighing 40-50 grams can undergo 15-25 wash cycles, indicating that a dissolution rate of approximately 2-3 grams/wash can be achieved. In some embodiments, a dissolution rate of up to 5 g/wash may be achieved. Depending on the type of the dishwashing machine, the flow rate of rinse water may vary from 300 L/h to 350 L/h. In addition, the rinse time typically can vary from 10 s to 60 s. Therefore, depending on the dishwashing machine type, each wash cycle can use from about 1 L to about 5 L of water. Based on the volume of water used per wash cycle (e.g. 1-5 L), the dissolution rate of tablets in some embodiments of the present disclosure typically may be less than about 3 grams/L. In other embodiments, the dissolution rate of present tablets may be less than about 2 gram/L, less than about 1 gram/L, or even less than about 0.5 gram/L. In one particular embodiment, the dissolution rate of present tablets is less than about 1 gram/L.

In another embodiment, the tablet of the present disclosure achieves a satisfactory dissolution rate in an automatic dishwashing machine (for example, less than about 2 gram/L) regardless of the position at which the tablet is placed in the automatic dishwashing machine. Thus, no particular restrictions need to be placed on the location of the tablet within the dishwashing machine in order for a user to obtain satisfactory performance. Advantageously, the tablets are particularly suitable for industrial application of dishwashing machines, which needs to be user friendly and requires minimum restriction on the user's operation conditions. The dissolution rate of the tablet is independent of the tablet's position in the washing machine, and therefore is independent of the flow rate or water pressure directly experienced by the tablet. This advantage makes the tablet of the present technology a robust solution to deliver controlled dissolution, which is suitable for use irrespective of the type (or model) of the dishwashing machine, particularly hood type single tank machines.

Accordingly, in one aspect the present disclosure provides detergent tablets which are able to deliver controlled dispensing of active ingredients per wash cycle (e.g. maintaining 100-150 ppm of alkalinity as $Na_2O$). These tablets can last multiple fill, wash, rinse, and empty cycles with consistent product delivery in the wash bath. These tablets maintain a consistent dissolution rate in each wash cycle without any abrupt disintegration between washes.

In another aspect, the present disclosure also provides a method of washing wares, which includes contacting a wash liquid with the detergent tablet of the present disclosure in an automatic dishwashing machine. Examples of wares include, but are not limited to, dishwares, pots, pans, silverware, cooking utensils, eating utensils, cutlery, tumblers, and crockery. In various embodiments, automatic dishwashing machines, which may include hood type dishwashing machines or under-counter glass washers, generally include machines that wash wares within a housing. A dishwashing machine for use with the presently-disclosed detergent tablets may use 1-5 L of water during a wash cycle and 1-5 L of water during a rinse cycle. Typically, tablet dissolution is independent of water hardness. For example, the tablet can provide controlled dissolution at about 400-500 ppm of water hardness. Rinse water temperature can be equal to or lower than about 90° C. Wash tank temperature can be equal to or lower than about 65° C. Rinse water flow rate or pressure can be equal to or lower than about 300 l/h. Wash time can range from about 30 seconds to about 2 minutes. Rinse time can range from about 5 seconds to about 30 seconds.

In one embodiment, the detergent tablet includes a dishwashing detergent composition and a crosslinked acrylic acid polymer having a weight average molecular weight (Mw) of at least 500,000. Suitable polymers for the present method include carbomer copolymers, such as the commercial products Carbopol® Ultrez 20 and Carbopol® 674 by Lubrizol Corporation. The crosslinked acrylic acid polymer typically is in powder form and in some embodiments has a glass transition temperature of from about 50° C. to about 150° C. In other embodiments, the glass transition temperature can be from about 70° C. to about 130° C., from about 80° C. to about 120° C., or from about 90° C. to about 110° C. In one particular embodiment, the crosslinked acrylic acid polymer has a glass transition temperature of about 105° C. In one embodiment, when dispersed in water at a concentration of 1%, at a pH of about 7.5, and at a temperature of 25° C., the crosslinked polymer of the present disclosure typically has a viscosity of at least about 3000 mPa·S. In other embodiments, the viscosity under such conditions may be at least about 5000 mPa·S, at least about 10000 mPa·S, at least about 15000 mPa·S, or at least about 20000 mPa·S.

In one embodiment, the tablet dissolves at a rate of less than about 2 grams per liter during the washing process in an automatic dishwashing machine. Advantageously, the dissolution rate of less than about 2 grams per liter can be achieved regardless of the position of tablet in the automatic dishwashing machine.

The following non-limiting examples illustrate the detergent tablet of the present disclosure and method of use thereof.

EXAMPLES

Example 1. Preparation of Tablets by Rapid Mixer Granulation

The following ingredients were mixed in a rapid mixer for a batch of 5 Kg detergent tablets. The rapid mixer was set at slow to medium speed with the chopper on. During the rapid mixer granulation, a 70% solution of vector was sprayed within 1 minute with slow mixing and the chopper on medium speed. The mixing was continued for 2-3 more minutes for complete granulation with the intermediate chopper on. The mixture was dried on a tray at 70° C. overnight so that the moisture content was reduced to less than 4%. The granules (100%) passed through 10 mesh sieve. The granules showed at least 70%-80% retention on 30 mesh and 20-30% retention on 60 mesh.

| Chemical (Trade Name) | Weight % |
|---|---|
| MGDA (Trilon M) powder, 84% | 5.210% |
| HEDP (CODEX DS) powder, 80% | 1.500% |
| Acrylate polymer (Accusol 445 G), 95% | 5.000% |
| Copolymer (Sokalan PA30 granules), 92% | 2.080% |
| Sodium Metasilicate Anhydrous, 100% | 10.000% |
| Antifoam (/SilFoam), 100% | 1.000% |
| Vector IC 27216 | 8.000% |
| Crosslinked acrylic acid polymer (Carbopol Ultrez 20) | 2.000% |
| Soda Ash, 100% | 60.00% |
| Balance (soda ash) | 5.21% |

An extra heavy-duty No. 10 single stroke multipunch tablet making machine with an output of 3300-65000 tablets per hour, having 68 mm tablet diameter (max.) with 12-20 metric ton operating pressure, was used for tablet punching. The machine was fitted on a rigid stand, with a 3HP, 3-phase, 1440 RPM electric motor. The technical specifications of the tablet punching machine (Model T-EHD8) are shown below. Typically, tablets with diameter of about 60 mm weighing 35-50 g were obtained.

| Tablet Size (Dia) | Single Punch: up to 70 mm |
|---|---|
| Filling Depth | 30 mm |
| Stroke | 50/m |
| Operating Pressure | 20 metric ton |
| Output per hour | 3300 to 65000 |
| Electricity | 220 v |
| Motor | 3 HP III phase TEFC motor |
| Weight Gross | 780 kgs |
| Weight Net | 685 kgs |
| Physical Dimensions | 100 × 77 × 177 cms LBH |
| Case Dimensions | 106 × 83 × 183 cms LBH |

Similar tablets with 2% binder content were made using Carbopol 674 and other types of polymers, including Polyox WSR (Dow Chemical), PVP-VA S630 (ISP), PVP-K90 (ISP), Methocel K100 M, Methocel K15 M, Methocel K4 M.

Example 2. Friability and Dissolution Tests

The tablets were subjected to friability tests to determine their ability to withstand shock and abrasion. A rotating plastic chamber with a dropping height of 15 cm was used. The tablets were weighed (e.g. with an accuracy of 0.01 gram) and placed in the plastic chamber. The chamber was rotated by a device (e.g. Erweka TAD/R) at about 25 rpm for about 4 minutes. The tablets were then removed from the chamber, dusted, and weighed again. Friability is expressed as percentage weight loss after the testing:

Friability=(Weight before testing−Weight after testing)/(Weight before testing)×100%

Tablets containing 2% of Carbopol 674 or Ultrez 20 were prepared according to the following formulas using the manufacture method of Example 1.

| Chemical (Trade Name) | P3/1-VS5/UP | P3/1-VS5/CP | P3/1-V8/UP | P3/1-V8/CP | P3/11-VS5/CP | P3/12-VS5/CP |
|---|---|---|---|---|---|---|
| MGDA (Trilon M) Powder, 84% | 5.210% | 5.210% | 5.210% | 5.210% | 5.210% | 7.800% |
| HEDP (CODEX DS) Powder, 80% | 1.500% | 1.500% | 1.500% | 1.500% | 1.500% | 1.500% |
| Acrylate polymer (Accusol 445 G), 95% | 5.000% | 5.000% | 5.000% | 5.000% | 5.000% | 7.500% |
| Copolymer (Sokalan PA30 granules), 92% | 2.080% | 2.080% | 2.080% | 2.080% | 2.080% | 3.120% |
| Sodium Metasilicate Anhydrous, 100% | 10.000% | 10.000% | 10.000% | 10.000% | 0 | 0 |
| Sodium Metasilicate Pentahydrate, 100% | 0 | 0 | 0 | 0 | 10.000% | 10.000% |
| Antifoam (/SilFoam), 100% | 1.500% | 1.500% | 1.500% | 1.500% | 1.500% | 1.500% |
| Vector IC, 28% | 0 | 0 | 8.000% | 8.000% | 0 | 0 |
| Varisoft 222 LM, 90% | 5.000% | 5.000% | 0 | 0 | 5.000% | 7.500% |
| Soda Ash, 100% | 60.000% | 60.000% | 60.000% | 60.000% | 60.000% | 59.080% |
| Carbopol 674, 100% | 0 | 2.000% | 0 | 2.000% | 2.000% | 2.000% |
| Ultrez 20, 100% | 2.000% | 0 | 2.000% | 0 | 0 | 0 |
| Balance (Soda Ash) | 7.710% | 7.710% | 4.710% | 4.710% | 7.710% | 0 |

As shown in FIG. 1, tablets containing 2% of Ultrez 20 lost about 1.2%-1.7% of weight, and tablets containing 2% of Carbopol 674 lost about 0.5%-0.7% of weight during the friability test. This demonstrates that crosslinked acrylic acid polymers, such as carbomer polymers, can provide the tablets of the subject disclosure with satisfactory hardness and resistance to shock and abrasion without the use of conventional binder materials or additional process control devices or pressures. Under these conditions, Carbopol 674 yielded better results (i.e. less weight loss) than Ultrez 20, while both provided acceptable tablets (less than 2% weight loss).

The tablets were then tested for their dissolution rate in an automatic dishwashing machine. The number of washing cycles the tablets can survive before complete dissolution in the automatic dishwashing machine was determined. In general, tablets with Ultrez 20 were able to last more than 15 wash cycles. Tablets with a weight of 45-50 g lasted up to 15-18 washing cycles, indicating that a dissolution rate of 3 g/w was achieved. A Meiko DV 80.2 single tank Hood type machine was used for the testing. The water used for the testing had a hardness of equal to or lower than 200 ppm. Rinse time was about 7 to 10 seconds with a rinse water volume of 3 L/cycle and a rinse temperature of 80° C. The wash temperature was set at 55° C. and the wash time was set at 45 seconds to 1 minute.

The dissolution results of formulation P3/12-VS5/CP is shown in Table 1 and FIG. 2 below as representative of the tablets containing Ultrez 20 or Carbopol 674. Tablets (indicated by different Tablet ID) were tested collectively for a total number of 175 washes (Total Wash). Each tablet was weighed before the putting in the washing machine for testing (Wi). After a certain number of washes (No. Wash) that particular tablet was recovered and weighed after drying (Wf).

TABLE 1

| SL No. | Total Wash | No. Wash | Tablet ID | Initial (Wi) | Final (Wf) | Tablet Position | g/wash | g/L |
|---|---|---|---|---|---|---|---|---|
| 1 | 0 | 5 | 3.40.14 | 58.8 | 50.5 | Centre below Wash arm | 1.66 | 0.55 |
| 2 | 19 | 19 | 3.45.21 | 59.3 | 33.12 | Centre below Wash arm | 1.38 | 0.46 |
| 3 | 34 | 15 | 3.40.8 | 58.4 | 40.1 | Centre below Wash arm | 1.22 | 0.41 |
| 4 | 59 | 25 | 3.40.2 | 59.3 | 30 | Centre below Wash arm | 1.17 | 0.39 |
| 5 | 89 | 30 | 3.30.6.2 | 58 | 24 | Centre below Wash arm | 1.13 | 0.38 |
| 6 | 104 | 15 | 3.45.6 | 59.9 | 22.4 | Above holding tank strainer | 2.50 | 0.83 |
| 7 | 127 | 23 | 3.45.8 | 54.6 | 0 | Corner near drain (flat surface, not in contact with water) | 2.37 | 0.79 |
| 8 | 152 | 25 | 23.40.16 | 58 | 0 | Corner near drain (flat surface, not in contact with water) | 2.32 | 0.77 |
| 9 | 175 | 23 | 3.40.14 | 50.5 | 20.55 | Centre below Wash arm | 1.30 | 0.43 |

Figure 2:
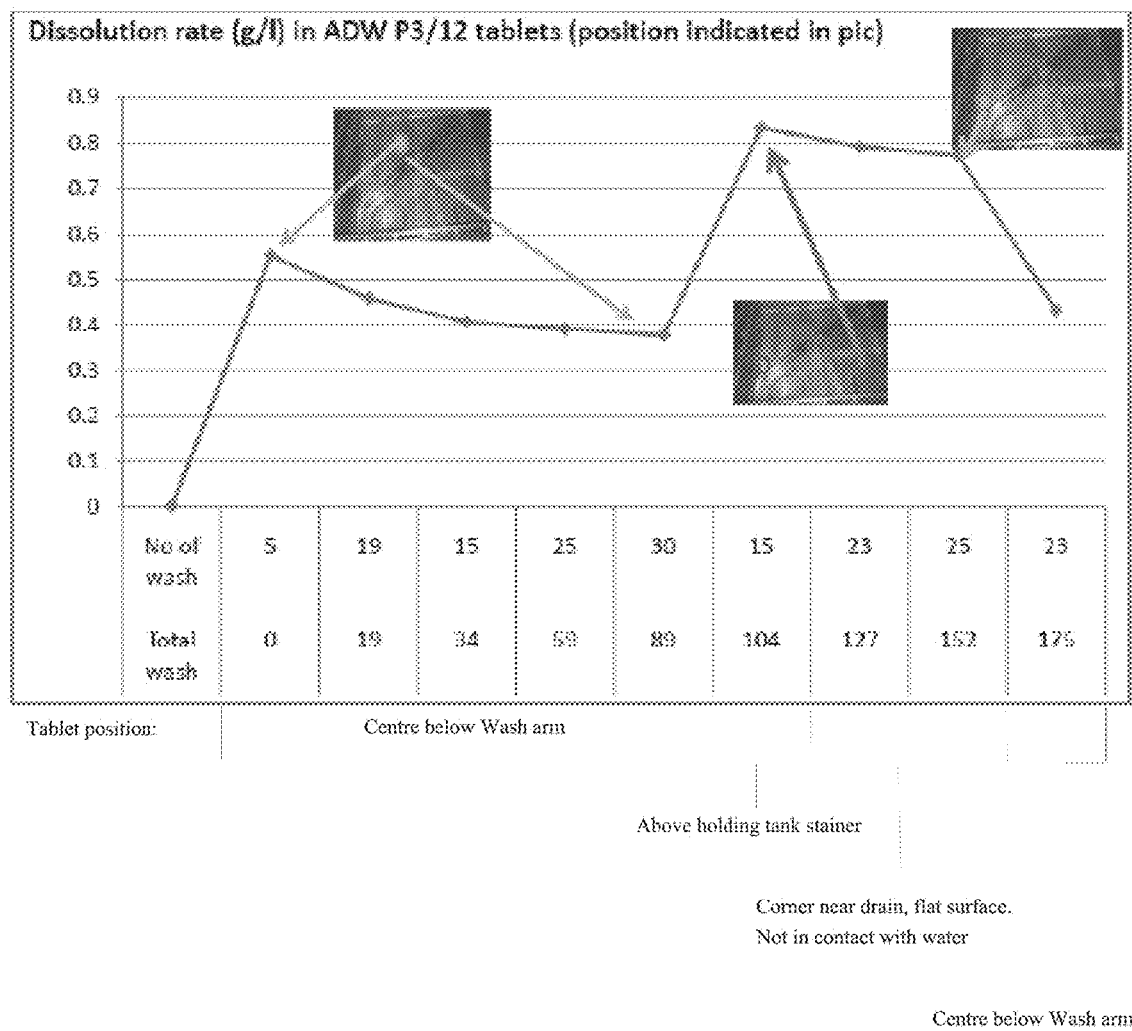
FIG. 2 shows the position of the tablet in an automatic dishwashing machine and the corresponding dissolution rate. Left: center below wash arm; Middle: above holding tank strainer; Right: Corner near drain (flat surface, not in contact with water).

As shown in Table 1 and FIG. 2, the tablet can achieve a dissolution of less than 3 g/wash, or less than 1 g/L as measured by the volume of washing liquid in each washing cycle. Specifically, for any given tablet, the dissolution rate remained within 0.4-0.8 g/L whether it was measured after 5 washes, 15 washes, 20 washes, or 30 washes. This means that the tablet delivered desired dissolution from the beginning of its use. Further, the results show that such dissolution was achieved independent of the tablet's location within the machine. Even when the dishwashing machine was operated continuously up to 175 washes while changing tablets about every 20-30 washes (different IDs), the dissolution remained unaffected. This shows that the tablet of the present technology has achieved a consistent dissolution rate.

Remarkably, the tablet maintained the satisfactory dissolution rate (e.g. less than 1 gram/L) independent of the position in which the tablet was placed in the automatic dishwashing machine. Table 1 and FIG. 2 indicate that the dissolution rate was maintained below 1 gram/L when the tablet was placed near the center below wash arm, or above holding tank strainer, or at the corner near drain (flat surface, not in contact with water), with the dissolution rate near the center below wash arm being particularly slower (i.e. about or less than 0.5 gram/L).

Advantageously, since the tablets of the present disclosure maintained a controlled dissolution at different locations in the dishwashing machine, they did not need a holder to control their dissolution rate, which is a typical method for tablet control in industrial wash processes. In general, the detergent tablets of the present disclosure were able to deliver controlled dispensing of active ingredients per wash cycle (e.g. maintaining 100-150 ppm of alkalinity as $Na_2O$). These tablets lasted multiple fill, wash, rinse, and empty cycles with consistent product delivery in wash bath without any abrupt disintegration between washes. In contrast, the tablets containing other polymer binders (e.g. polyox) all dissolved or disintegrated completely within 2 wash cycles.

In summary, the use of crosslinked acrylic acid polymers such as carbomer products (e.g. Carbopol Ultrez 20 or Carbopol 674) as a binder provides the detergent tablet of the present disclosure with advantageous properties including both sufficient hardness and controlled dissolution. Thus, the tablet of the present disclosure can be used in both household automatic dishwashing machines and in industrial applications for machine ware washing.

Example 3. Sachet Detergent Formulation

A sachet for dishwashing detergent was prepared. The sachet contained a controlled-dissolution tablet (weighing about 60 grams) and an initial dose of detergents (in the form of a powder or granules, weighing about 20 grams) according to the following formulas.

| Components | Weight % |
|---|---|
| Controlled-Dissolution Tablet (about 60 g) | |
| MGDA Powder(Trilon M powder) 87% | 7.80% |
| HEDP Powder 80% | 1.50% |
| Acrylate polymer (Accusol 445 G) 95% | 7.50% |
| Copolymer (Sokalan PA30 granules) 92% | 3.12% |
| Sodium Metasilicate pentahydrate 100% | 10.00% |
| Solbond NE 60 (80%) | 7.50% |
| SilFoam SP 150 (100%) | 1.50% |
| Carbopol 674 (100%) | 3.00% |
| Talcum Powder (20 micron) | 1.00% |
| LLPO (mineral oil) | 0.40% |
| PEG 6000 | 1.00% |
| Soda Ash Light | 55.6800% |
| Total | 100% |
| Initial Dose (about 20 g) | |
| MGDA Powder(Trilon M powder) 87% | 7.80% |
| HEDP Powder (CODEX DS) 80% | 1.50% |
| Acrylate polymer (Accusol 445 G) 95% | 7.50% |
| Copolymer (Sokalan PA30 granules) 92% | 3.12% |
| Solbond NE 60 (80%) | 7.50% |
| SilFoam SP 150 (100%) | 1.50% |
| Carbopol 674 (100%) | 0.00% |
| Soda Ash Dense | 71.0800% |
| Total | 100% |

Typically, the granular sodium metasilicate was ground and sieved using a 10-mesh sieve, and was then placed in two blenders with choppers. To the first blender, ingredients for the controlled-dissolution tablet (including the Carbopol binder) were added and the ingredients were mixed thoroughly. Non-aqueous liquid, such as mineral oil or silicon oil, was added through a spray nozzle to prevent powder from flying off. To the second blender, the ingredients for the initial dose (which did not contain any binder) were added and mixed thoroughly. The ingredients for either the tablet or the initial dose were further ground by passing through a milling machine to remove any lumps or large particles. For lubrication, a flow aid agent (such as talcum powder or silica powder) was added to the blender containing the ingredients for the controlled-dissolution tablet, and the mixture was further mixed for 15 minutes. Immediately after lubrication and a quality check for moisture and particle size, the controlled-dissolution tablets were prepared by a compression process similar to that described in Example 1. The tablets were immediately sealed in a pouch with the initial dose powder (from the second blender) for further packaging. Each pouch contained about 15-20 grams of initial dose powder. The controlled-dissolution tablet typically weighed about 60 grams, in a range from about 58 to about 62 grams. The tablet typically had a diameter of from about 60 mm to about 64 mm, and a thickness from about 10 mm to about 15 mm. The tablets showed less than 1% weight loss in friability test, and had a hardness of from about 8 Kgs to about 10 Kgs in a manual hardness test.

Figure 3:
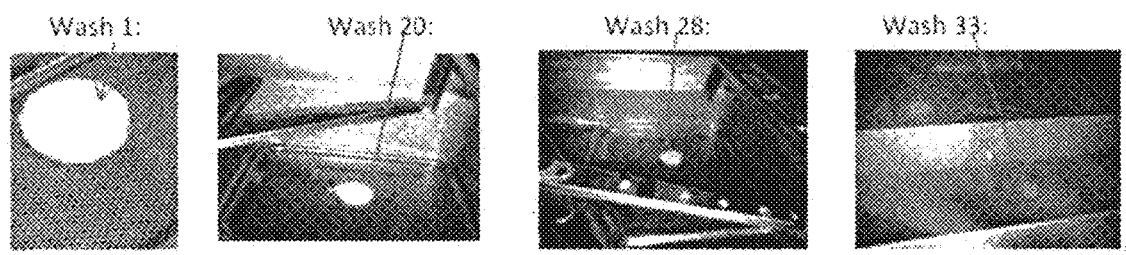
FIG. 3 shows a representative dissolution process of the tablet disclosed in Example 3 at different numbers of washes using a 1-minute washing cycle in a dissolution test.

The dissolution properties of the tablets were tested using Meiko DV 80.2 type machine under conditions similar to those described in Example 2. The tablets were placed over the scrap tray, and the number of washes was counted by the machines. Both 1-minute (45-second wash and 10-second rinse) and 2-minute (100-second wash and 10-second rinse) washing cycles were tested. The wash temperature was about 60° C., and the rinse temperature was about 80° C. The tablets typically lasted for at least 30-35 washes using 1-minute washing cycles and at least 20-25 washes using 2-minute washing cycles before being completely dissolved by the washing liquid. Here, "completely dissolved" or "complete dissolution" means that less than 0.1% of the tablet remains visible after a certain number of washes in the dissolution test. In a particular test, five tablets were randomly selected from a batch of tablets produced by the above process, and were shown to last at least 30, 33, 31, 30, and 31 washes, respectively, before being completely dissolved using 1-minute washing cycles. FIG. 3 shows a representative dissolution process of the tablets at different numbers of washes in these tests.

The drying time and alkalinity were also measured for these tablets during the tested wash cycles. Substrates tested included stainless steel cups (La Chef, Elektroblok B, with a usable area (bottom) of 45×86 mm, glass plates (148×79×4 mm), and plastic plates naturel (Nytralon 6E, Quadrant Engineering Plastic Products, 97×97×3 mm). Drying time was determined (in seconds) of the washed substrates at ambient temperature immediately after opening the machine. When drying time was longer than 300 seconds, it was recorded as 300 seconds, and the remaining droplets on the substrates were counted. The average values of the drying times and the average values of the number of droplets on the substrates after 300 seconds from 3 separate tests (using 2 items for each of glass, plastic, and stainless steel substrates) were determined.

The alkalinity of the detergent solution during the dissolution of the tablets was also tested by acid titration. Typically, the detergent solution (5 mL) was removed from machine wash tank and was titrated by 0.15 N HCl (added dropwise) using phenolphthalein as indictor. At the end point of each titration (indicated by a color change of the detergent solution from pink to colorless), the number of drops of the HCl solution consumed was noted. One drop of the HCl solution represented approximately 30 to 33 ppm of alkalinity.

Figure 4A:
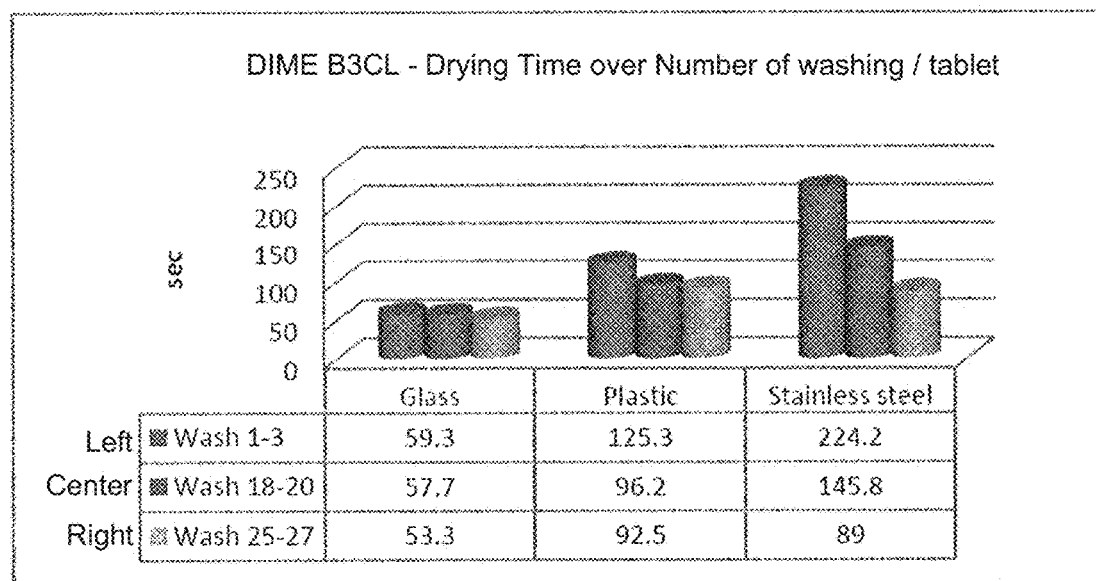
FIG. 4A shows the drying time of glass, plastic, and stainless steel surfaces after being washed in a dishwashing machine using the tablet detergent disclosed in Example 3 at various numbers of washes.
Figure 4B:
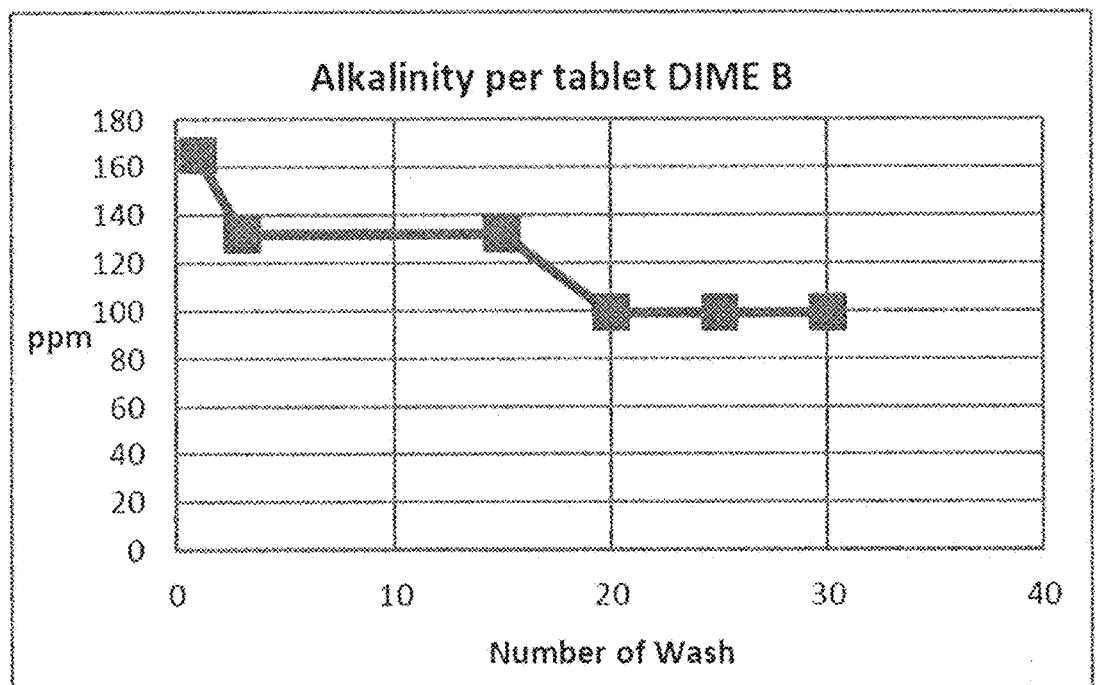
FIG. 4B shows the alkalinity change over the numbers of washes for the tablet detergent disclosed in Example 3.

As show in FIGS. 4A and 4B, the drying time of the washed wares and the alkalinity of the detergent solution remained consistent during the entire controlled dissolution process of the presently disclosed tablets. Specifically, FIG. 4A shows that the drying time of glass and plastic surfaces were each maintained at about 60 seconds and about 100 seconds, respectively, during the early (1-3 washes), middle (18-20 washes), and late (25-27 washes) stages of the tablet's dissolution process. Similarly, FIG. 4B shows that the alkalinity level in the detergent solution was maintained at 100-140 ppm for at least 30 washes under these conditions, indicating a consistent delivery of the detergent components throughout the dissolution of the tablets. Collectively, these results indicate that the presently disclosed tablets dissolve in a controlled manner to provide consistent cleaning and drying results.

Without being limited by any theory, it was observed that higher binder concentrations (e.g., higher than 3% by weight) often led to sticky compositions that were not ideal for tablet formation by compression, and that inclusion of talc powder (e.g., 20 micron, at about 1% by weight) resulted in non-sticky tablets. However, addition of talc powder notably reduced the number of washes that the tablet lasted before complete dissolution. In addition, addition of mineral oil reduced the harmful dust level resulting from the use of talc powder during tableting process.

Various features and advantages of the invention are set forth in the following claims.

What is claimed is:
1. A method of preparing a dishwashing detergent tablet, the method comprising
   mixing i) a dishwashing detergent composition and ii) a sequestering agent comprising
   (a) an aminocarboxylic acid selected from methylglycine diacetic acid (MGDA), glutamic acid diacetic acid (GLDA), diethylene triamine pentaacetic acid (DTPA), hydroxyethyl ethylene diamine triacetic acid (HEDTA), ethylenediaminetetraacetic acid (EDTA), and a combination thereof;
   (b) a phosphonic acid selected from 1-hydroxyethane 1,1-diphosphonic acid (HEDP), amino tris(methylenephosphonic acid) (ATMP), ethylenediamine tetra (methylene phosphonic acid) (EDTMP), tetramethylenediamine tetra(methylene phosphonic acid) (TDTMP), hexamethylenediamine tetra(methylene phosphonic acid) (HDTMP), diethylenetriamine penta(methylene phosphonic acid) (DTPMP), and a combination thereof; and
   (c) at least one acrylic acid polymer having average molecular weight of less than 12,000
   and iii) a crosslinked acrylic acid polymer having a weight average molecular weight (Mw) of at least 500,000; and
   compressing the mixture into a tablet.
2. The method of claim 1, wherein the crosslinked acrylic acid polymer of iii) is in powder form and has a glass transition temperature of 105° C.
3. The method of claim 1, wherein the crosslinked acrylic acid polymer of iii) has a viscosity of at least 3000 mPa·S when dispersed in water at a concentration of 1%, pH 7.5, and a temperature of 25° C.
4. The method of claim 1, wherein the dishwashing detergent composition comprises at least one ingredient selected from the group consisting of alkalinity source, surfactant, sequestrating agent, defoamer, and rinse aid.

5. The method of claim 4, wherein the alkalinity source comprises one selected from the group consisting of sodium carbonate, sodium hydroxide, potassium hydroxide, sodium metasilicate, and combinations thereof.

6. The method of claim 1, wherein the mixing step is carried out in a rapid mixer granulator.

7. The method of claim 6, further comprising controlling the moisture content of the mixture at a level of no more than 5% during the mixing step.

8. The method of claim 6, further comprising controlling the temperature of the mixture below 55° C. during the mixing step.

9. The method of claim 6, wherein the granules from the mixing step pass through 30 mesh sieve.

10. The method of claim 1, wherein the compressing step is carried out by a single stroke punching machine with a pressure of 20 tons.

11. A method of washing wares comprising contacting a wash liquid with a detergent tablet in an automatic dishwashing machine, wherein the detergent tablet comprises
   i) a dishwashing detergent composition;
   ii) a sequestering agent comprising
      (a) an aminocarboxylic acid selected from methylglycine diacetic acid (MGDA), glutamic acid diacetic acid (GLDA), diethylene triamine pentaacetic acid (DTPA), hydroxyethyl ethylene diamine triacetic acid (HEDTA), ethylenediaminetetraacetic acid (EDTA), and a combination thereof;
      (b) a phosphonic acid selected from 1-hydroxyethane 1,1-diphosphonic acid (HEDP), amino tris(methylenephosphonic acid) (ATMP), ethylenediamine tetra (methylene phosphonic acid) (EDTMP), tetramethylenediamine tetra(methylene phosphonic acid) (TDTMP), hexamethylenediamine tetra(methylene phosphonic acid) (HDTMP), diethylenetriamine penta(methylene phosphonic acid) (DTPMP), and a combination thereof; and
      (c) at least one acrylic acid polymer having average molecular weight of less than 12,000; and
   iii) a crosslinked acrylic acid polymer having a weight average molecular weight (Mw) of at least 500,000.

12. The method of claim 11, wherein the crosslinked acrylic acid polymer of iii) is in powder form and has a glass transition temperature of 105° C.

13. The method of claim 11, wherein the crosslinked acrylic acid polymer of iii) has a viscosity of at least 3000 mPa·S when dispersed in water at a concentration of 1%, pH 7.5, and a temperature of 25° C.

14. The method of claim 11, wherein the tablet dissolves at a rate of less than 2 grams per liter in an automatic dishwashing machine.

15. The method of claim 14, wherein the tablet dissolves at a rate of less than 1 gram per liter in an automatic dishwashing machine.

16. The method of claim 14, wherein the dissolution rate of the tablet in an automatic dishwashing machine remains at less than 2 grams per liter regardless of the position of tablet in the automatic dishwashing machine.

17. The method of claim 11, wherein the dishwashing detergent composition comprises at least one ingredient selected from the group consisting of alkalinity source, surfactant, sequestrating agent, defoamer, and rinse aid.

18. The method of claim 17, wherein the dishwashing detergent composition comprises an alkalinity source selected from the group consisting of sodium carbonate, sodium hydroxide, potassium hydroxide, sodium metasilicate, and combinations thereof.

19. The method of claim 17, wherein the dishwashing detergent composition comprises a rinse aid selected from the group consisting of cationic starch, cationic esterquat, and combinations thereof.

20. The method of claim 1, wherein the tablet has a diameter of from about 50 mm to about 70 mm; a thickness of from about 10 mm to about 20 mm; and a weight from about 40 grams to about 80 grams.

21. The method of claim 11, wherein the tablet has a diameter of from about 50 mm to about 70 mm; a thickness of from about 10 mm to about 20 mm; and a weight from about 40 grams to about 80 grams.

* * * * *